Oct. 4, 1938.  A. P. BALL  2,132,009
ADJUSTABLE SEAT
Filed Dec. 6, 1934    3 Sheets-Sheet 1
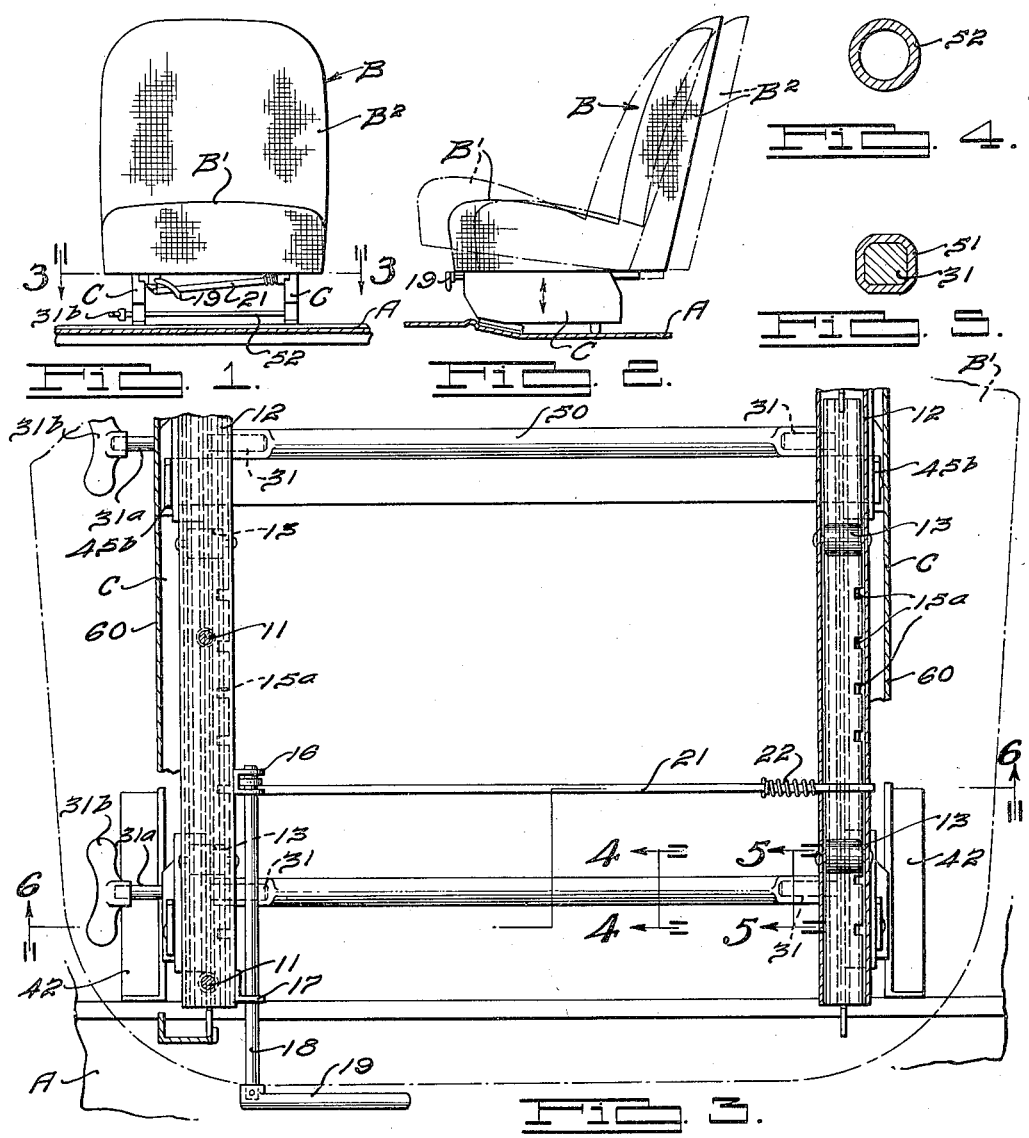
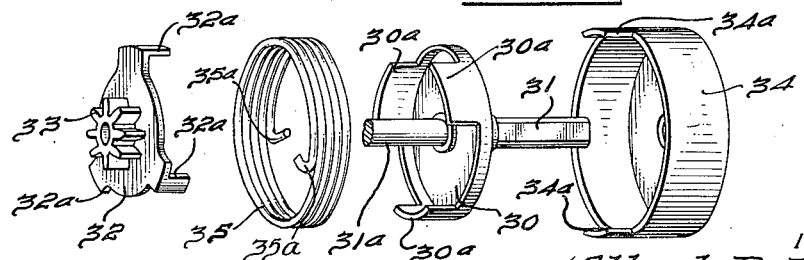
INVENTOR
Albert P. Ball.
BY Dike, Calver & Gray
ATTORNEYS

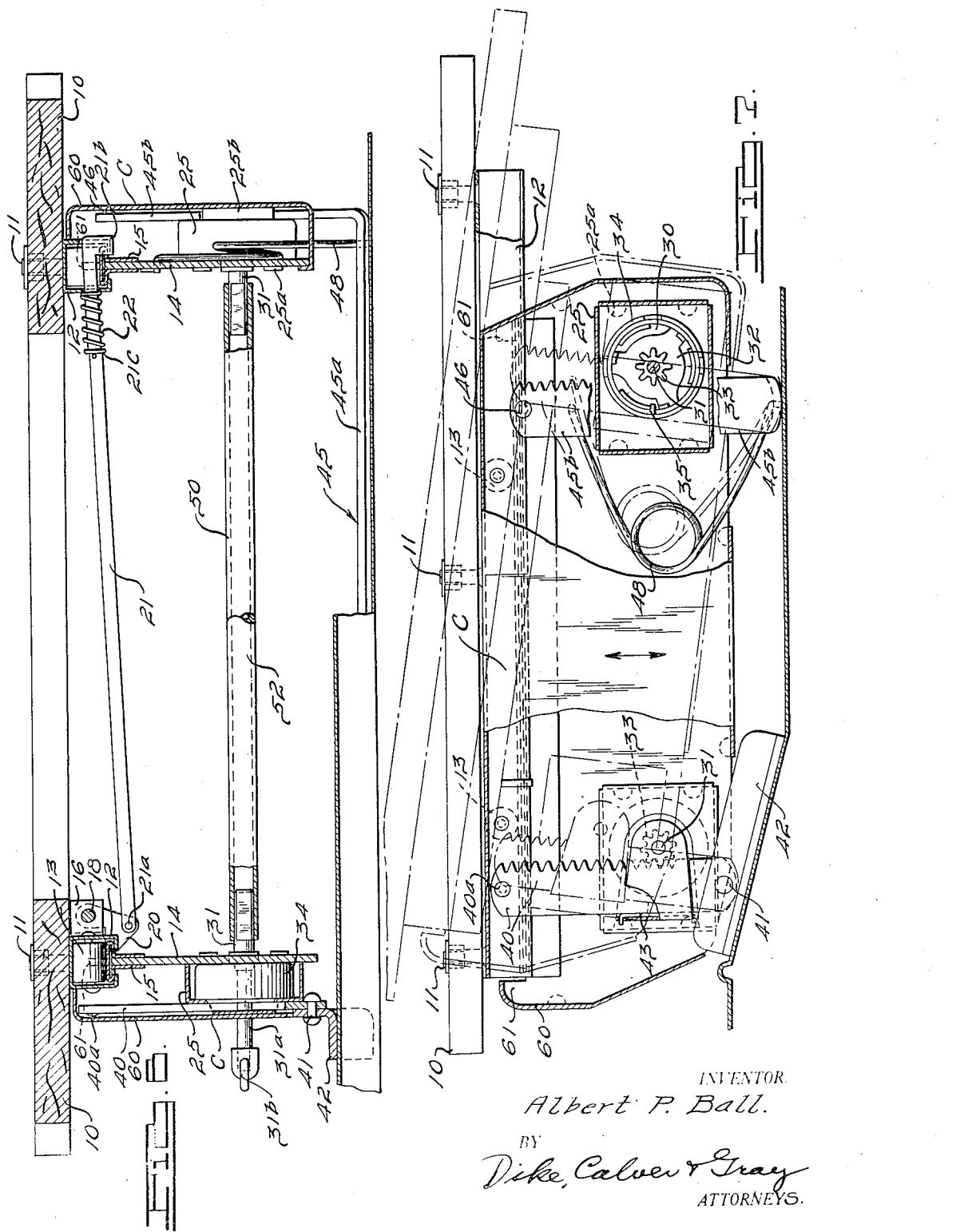

Oct. 4, 1938.   A. P. BALL   2,132,009
ADJUSTABLE SEAT
Filed Dec. 6, 1934   3 Sheets-Sheet 3
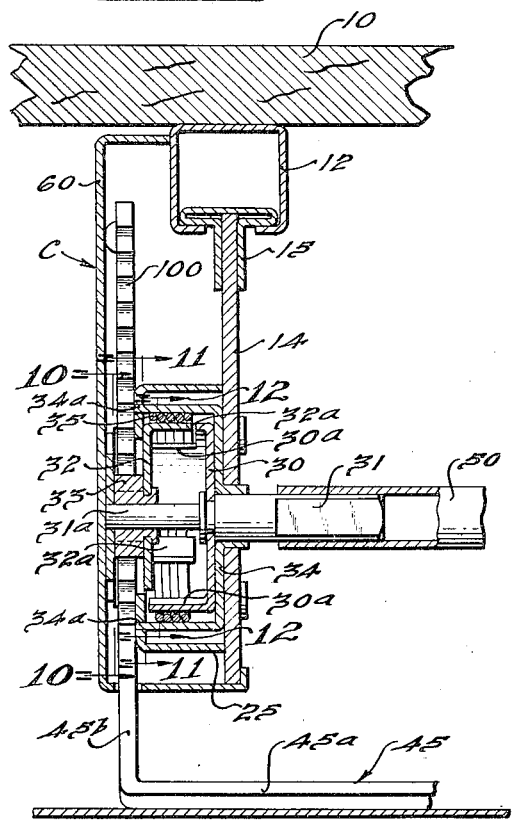
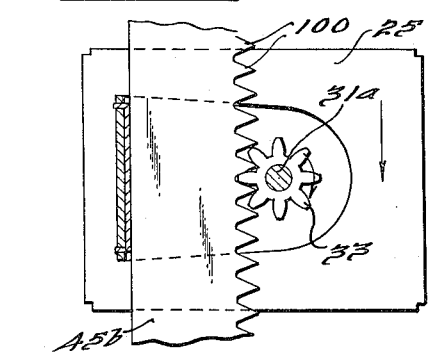
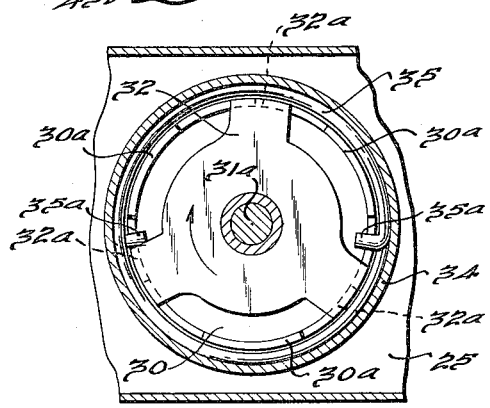
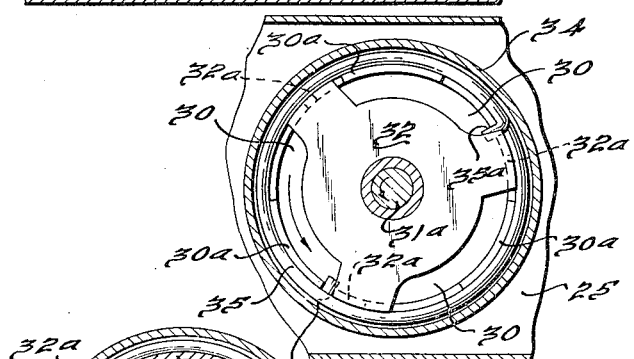
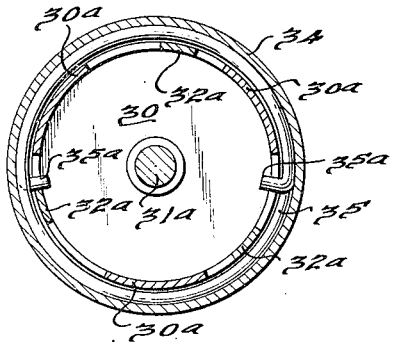
INVENTOR
Albert P. Ball.
BY Dike, Calver & Gray
ATTORNEYS.

Patented Oct. 4, 1938

2,132,009

UNITED STATES PATENT OFFICE 2,132,009

ADJUSTABLE SEAT

Albert P. Ball, Detroit, Mich., assignor to Briggs Manufacturing Company, Detroit, Mich., a corporation of Michigan Application December 6, 1934, Serial No. 756,295

12 Claims. (Cl. 155—14)

This invention relates to adjustable seats for vehicles, such as motor vehicles, and especially to a seat which is capable of being manually adjusted by the occupant thereof.

One of the objects of the invention is to provide a seat of the foregoing character which can be raised and lowered and adjusted to different tilted positions, as well as being moved bodily to various adjusted positions longitudinally of the vehicle floor or support, these various adjustments being capable of accomplishment by the occupant while seated therein.

Another object of the invention is to provide relatively simple and inexpensive mechanism for effecting the adjustment of the seat with ease and facility.

Further objects and advantages of the invention will appear from the following description and appended claims when considered in connection with the accompanying drawings forming a part of this specification.

In said drawings:

Fig. 1 is a front elevation of an adjustable seat embodying the present invention.

Fig. 2 is a side elevation of the seat of Fig. 1.

Fig. 3 is a horizontal section, on an enlarged scale, taken substantially along the line 3—3 of Fig. 1, looking in the direction of the arrows.

Fig. 4 is a detail section substantially on line 4—4 of Fig. 3.

Fig. 5 is a detail section taken substantially along the line 5—5 of Fig. 3.

Fig. 6 is a transverse section, partly in elevation, taken substantially along the line 6—6 of Fig. 3, in the direction of the arrows.

Fig. 7 is a side elevation, partly in section, of the construction shown in Fig. 6.

Fig. 8 is a perspective view, on an enlarged scale, showing the parts of the clutch mechanism in disassembled relation.

Fig. 9 is an enlarged vertical section through one of the rear clutch units and associated parts.

Fig. 10 is a detail elevational view, partly in section, taken substantially along the line 10—10 of Fig. 9, looking in the direction of the arrows.

Fig. 11 is a vertical sectional view taken substantially along the line 11—11 of Fig. 9, looking in the direction of the arrows.

Fig. 12 is a vertical sectional view taken substantially along the line 12—12 of Fig. 9, looking in the direction of the arrows, and showing the parts in the same positions as in Fig. 11.

Fig. 13 is a sectional view, similar to Fig. 11, showing the parts in somewhat different positions; and Fig. 14 is a sectional view, similar to Fig. 12, and showing the parts in the positions in which they are shown in Fig. 13.

Before explaining in detail the present invention it is to be understood that the invention is not limited in its application to the details of constructions and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Various mechanism and means have been employed heretofore to effect the longitudinal adjustment of automobile seats toward and away from the cowl unit to accommodate occupants of different stature. It was impossible with previous constructions to provide for the vertical adjustment of the front and rear of the seat, one independently of the other. Therefore it has been impossible to obtain the proper adjustment of the seat to provide the necessary comfort to the occupant. In many cases it has been necessary for purchasers of motor vehicles to have specially built seats installed in an effort to obtain a reasonable degree of comfort when occupying the seat. It is therefore one of the purposes of the present invention to overcome the difficulties of previous adjustable seat constructions and to provide an easily and quickly adjustable seat capable of comfortably supporting occupants regardless of their statures, thus providing in effect, a universally adjustable seat.

Referring now to the drawings, there is shown in Figs. 1 and 2 by way of illustration, a bucket type of vehicle seat embodying the present invention. In these figures the vehicle floor or supporting surface is shown at A and the adjustable seat as a whole at B, having a seat portion or cushion B' and a back rest B². The combined seat supporting structure and adjusting mechanism is shown as a whole at C in Fig. 2.

Referring particularly to Figs. 3, 6 and 7, the seat platform or base is shown at 10 and is preferably of a shape corresponding to the outline of the seat cushion. Secured to the under side of the platform 10 in any suitable manner, as by means of bolts 11, is a pair of laterally spaced parallel longitudinally extending channel members 12 within each of which is journalled for rotation a pair of rollers 13 for a purpose to be described. The supporting means for the platform and the chair includes a pair of upright substantially parallel longitudinally extending plates or members 14, these plates supporting along their upper edges substantially T-shaped cap members or flanged runners 15 which are secured to the plate in any suitable manner as by means of spot-welding. The horizontal portions of the runners 15 are located within the channels 12 below and in contact with the rollers 13 (Fig. 6) thus permitting relative longitudinal sliding movement of the platform and channels with respect to the plates and their runners 15. As best seen in Figs. 3 and 6, the inner flanged edge of the left hand runner and the outer flanged edge of the right hand runner are provided with spaced notches 15a for the purpose of maintaining the seat in various adjusted positions. A releasable locking mechanism is provided for maintaining the seat in fixed adjusted position.

As shown, merely by way of illustration, this locking mechanism comprises a pair of brackets 16 and 17 rigidly secured to the inner vertical leg of the left hand channel member 12 and provided with aligned bearings to receive and support an oscillatable shaft 18 provided with an operating handle 19 located below the forward or front portion of the seat cushion B'. Rigidly mounted upon the shaft 17 between the legs of the U-shaped bracket 16 is a depending latch member 20 having a nose or projection adapted to fit within the notches 15a. A link or rod 21 is pivotally mounted at 21a adjacent the lower end of the latch 20 and extends transversely beneath the seat platform 10 through aligned openings or slots formed in the depending legs of the right hand channel member 12. The shaft at its right hand end is provided with a depending portion 21b having a nose providing a latch adapted to engage the notches 15a formed in the T-shaped flange 15. Adjacent the right hand channel, the rod 21 is provided with a stop member or collar 21c and is surrounded by a coil spring 22 having its opposite ends engaging the stop and the leg of the channel 12, respectively and exerting a force tending to maintain the rod or bar 21 toward the left which causes the latch members 20 and 21b to engage their respective notches 15a and lock the parts together against relative sliding movement.

The additional supporting mechanism for the seat and the means for effecting its vertical adjustment will now be described. Referring particularly to Figs. 6 and 7 each of the plates 14 on its outer face has secured thereto a clutch box or housing shown as a whole at 25 provided with tongues 25a which pass through slots in the plate 14 and are clinched over the inside face thereof. There are two such clutch boxes or housings for each plate, namely a front and a rear box for each of the plates. Each box is provided with an embossing 25b which has a vertical slot extending therethrough for a purpose to be described. Each clutch box or housing encloses a friction clutch mechanism of any conventional design.

Referring particularly to Figs. 8 to 14 inclusive, I have shown, by way of example, clutch mechanism of the present embodiment which comprises a driving plate or disk-like member 30 fixed to a shaft having a square end portion 31 and a round extension 31a. The disk 30 is provided with spaced outturned segmental lugs or tongues 30a, three such lugs being shown. The shaft portion 31a carries a driven member, preferably in the form of a spider 32, to which is fixed a pinion 33, the spider and pinion having registering holes providing a bearing for the shaft portion 31a. The driven member 32, as shown, has a plurality of spaced inturned notched-out lugs or tongues 32a, three such lugs being shown, which are adapted to fit within the spaces between the outturned lugs 30a of the driving member when the parts are assembled, see for example, Figs. 9, 11 and 13. The driving and driven members with their common shaft 31, 31a are adapted to fit within a cylindrical clutch casing or housing 34 provided with outwardly projecting spacer lugs 34a. The parts are assembled by inserting the driving member 30 into the clutch housing 34 and slipping a spiral torsion spring 35 of the expansible and contractible type over the lugs 30a of the driving member. The spring is thus interposed between the lugs 30a and the cylindrical wall of the casing 34. The opposite ends of the spring are inturned as shown at 35a and, when the parts are assembled, these ends are in position to be alternately and selectively engaged by certain of the lugs formed on the members 30 and 32. After the spring 35 and the driving member 30 have been thus assembled, the driven member 32 is slipped over the round end 31a of the shaft and the inturned lugs 32a of the member are brought into registry with the spaces between the spaced lugs 30a of the driving member.

Figs. 9 to 14 inclusive show in detail the various positions of the clutch parts when the clutch and pinion 33 are in operative relation with the rack 35 45b. The spring 35 envelops the nested together and interfitting lugs 30a and 32a of the driving and driven members, respectively, and is in effect a floating spring having no fixed connection to these members or to the clutch casing 34. It is understood that the clutch mechanism and clutch housing 25 are carried by the seat and that these parts travel up and down over and relative to the rack 45b which rests upon the vehicle floor and has rocking or tilting movement in a longitudinal arc relative to the seat and floor. In other words, during the upright adjustment of the seat, the rack has no upright movement.

The clutch mechanism is adapted to be actuated for raising and lowering the front and/or rear ends of the seat by turning either one of the keys 31b, one of which is attached to each pair of clutch units and their interconnecting members including the tube 50. The spring 35 remains normally in frictional contact with and against the wall of the cylindrical casing 34. When the key 31b, and in turn the shaft 31, 31a, are rotated in a counter-clockwise direction, see the arrows in Figs. 13 and 14, one of the lugs 30a of the driving member engages the inner face of one end 35a of the spring and contacts the spring to pull it away from engagement with the casing wall, as shown by the somewhat exaggerated space 101 in Figs. 13 and 14, and also engages the adjacent notched-out lug 32a of the driven member carrying the pinion 33. This causes rotation, in a similar counter-clockwise direction, of the driven member 32 and pinion 33. The pinion is thus caused to travel along the rack teeth 100 in an upward direction, whereby the rear end of the seat will be elevated. That is to say, rotation in this manner by means of the single rear key member 31b causes both rear pinions 33 and their attached clutches and enclosing casings or housings 25 to travel upwardly over the teeth 100 of the rear rack members 45b. After the seat has been adjusted to its desired elevated position, the parts return to their original positions and it is impossible to lower said seat by the application of weight to the seat. If that were attempted, as illustrated by the vertical arrow on casing 25 and the arcuate arrow on the pinion 33 in Fig. 10, the tendency of the weight would be to cause the pinion 33 to rotate in a clockwise direction. This is prevented by reason of the fact that the pinion is fixed to the driven member 32 and any attempt to turn said member other than by using the key, causes one of the lugs 32a thereof, see the lugs 32a at the left of Fig. 11, to engage the outer face of one end 35a of the spring, see also the leg at the left of Fig. 11, and expand the spring into binding engagement with the cylindrical wall of the clutch casing 34. Moreover, any attempt to elevate the seat by means of lifting it independently of the actuation of the operating key, would tend to turn the pinion in a counter-clockwise direction and likewise turn the driven member 32 in the same direction. In this case another one of the lugs 32a, see the lug at the right side of Fig. 13, would engage the opposite inturned end 35a of the spring at the right of Fig. 13, and expand the spring into binding engagement with the casing, thus frustrating any attempt to elevate the seat independently of the operation of the key.

When it is desired to lower the seat, for example the rear end of the seat, the operating key 31b is turned in a clockwise direction. Such turning movement causes a like turning or rotating movement of the driving member 30. In this case the lug 30a at the top center of Figs. 13 and 14 would move into engagement with the inner face of the adjacent end 35a of the spring at the upper right of these figures and into contact with the adjacent lug 32a of the pinion carrying member, thereby contracting the spring 35 or winding it away from the housing 34 in the same manner as described in connection with the authorized rotation by the key in a counter-clockwise direction, it being uderstood that the member 32 is driven by the member 30 through the engagement of their respective cooperating lugs. By thus contracting the spring by clockwise rotation of member 30, the pinion 33 is turned in a clockwise direction, whereupon it travels downwardly along the toothed face 100 of the rack to lower the rear end of the seat.

Thus it will be seen that positive means is provided for raising and lowering either or both ends of the seat by means of actuating keys and associated clutch mechanism, and that said clutch mechanism positively maintains the seat in adjusted position regardless of forces applied directly to the seat. It will also be seen that it is impossible to effect the vertical or upright up and down adjustment of either the front or rear end portions of the seat by the application of weight or pressure to the seat. Therefore, once the seat has been adjusted, the application of weight thereto will not affect the adjustment.

The plates 14 and the mechanism supported thereby are supported and adjusted vertically adjacent their forward ends by means of a pair of rack bars 40 which are pivotally connected by means of rivets 41 to angle bars or members 42 and are maintained in an upright position by reason of their being located in and extending through vertical guide slots formed in the embossings 25b. Each rack bar 40 is provided with a button or bearing member 40a which is located on the outer face of the bar adjacent its upper end. These buttons engage the main housing or casing 60 for the adjusting mechanism and thus reduce friction when the rack bars are being shifted about their pivots 41. The casing 60 is attached to and supported by the channel members 12 so as to move, as a unit, with the seat platform or base 10 during the adjustment of the seat, the casing serving to conceal the clutch boxes and adjusting mechanism. As shown in Fig. 7 a flat leaf spring 43 is provided between the wall of the clutch housing 25 and the rack bar to hold the teeth of the bar in engagement with the pinion 33.

The rear end of the platform and seat is supported on opposite sides by means of a substantially U-shaped bar or member 45 which has a base portion 45a and upstanding leg portions 45b. One edge of each of the legs is provided with rack teeth 100 and the legs extend through vertical guide slots formed in the embossings 25b of the rear pair of clutch boxes or housings. The rack bars 45b are provided with buttons or projections 46 which engage the main housing 60 and reduce friction during movement of the bars relative to the housing. A spring (not shown) which is similar to the spring 43 is provided for maintaining the teeth of each rack bar 45b in engagement with its pinion 33.

It will be seen that the base 45a of the U-shaped member rests upon the floor of the vehicle and serves to support the rear end of the seat. The member 45 merely rests upon the vehicle floor and is not connected to it. Therefore the entire seat can be tilted forwardly, the operating mechanism and housing 60 pivoting at the points 41. A pair of counterbalancing springs 48 each having its opposite ends secured to the base 45a and the plate 14, respectively, serve to assist in raising the back end of the seat, as will be seen hereinafter.

The stub shafts 31 of the rear clutches have inner squared end portions which fit snugly within the squared end portions or sockets 51 of a metal tube 50 which extends between and connects the opposed shafts. A similar tube or shaft 52 serves to connect the stub shafts 31 of the forward pair of clutches. Thus the rotation of the shaft 31 of one clutch will be transmitted to the corresponding shaft of the opposite clutch of each pair through the medium of the interconnecting tubes 50 and 52. To effect such rotation the shafts 31 are extended outwardly at 31a beyond the housing 60 below the platform 10 at the left side thereof, as seen in Fig. 3. Each shaft extension 31 is provided with a key or operating handle 31b. Therefore, when it is desirable to elevate the forward edge of the seat B, the key 31b under the front end of the seat is operated to rotate the shaft 31, the shaft extension 31a and the opposed shafts 31, this being effected through the driving plate 30 of the clutch. Rotation of the driving plate serves to compress the clutch spring 35 and permit the spider 32 to be rotated by the lugs on the driving plate, thereby rotating the pinion 33 of each of the forward clutch members. This causes the pinions to travel along the rack bars 40 and lift the housing 60 and enclosed mechanism relatively to the rack bars and their supporting angles 42. As seen in Fig. 7 the rack bars are free to oscillate during the upward or downward tilting movement of the seat. The platform and other associated parts will assume the positions in which they are shown in broken lines, Figs. 2 and 7. Also, if it is desired to elevate the rear portion of the seat B, the corresponding key 31b is operated to effect the rotation of the shaft extension 31a, shafts 31 and pinions 33 of the rear pair of clutches. This causes the rear pinions 33 to travel upwardly along the rack bars 45b and thus elevate the rear portion of the seat, the housing 60 and its enclosed mechanism relatively to the rack bars and floor of the vehicle. The counterbalancing springs 48, previously referred to, assist in the upward travel of the rear portion of the seat. The seat will be maintained in its adjusted elevated position by reason of the clutch springs 35 which when released bind against the clutch casings and lock the parts against relative movement independent of the operating keys and pinions. If it is desired, the seat may be shifted forwardly or rearwardly, this being accomplished by actuating the handle 19 to release the latches 20 and 21b from engagement with the notches 15a. The several adjustments of the seat can be effected by the occupant while seated therein so that the seat can be adjusted as to height and leg room to suit the comfort of the occupant.

It will be understood of course that the vertical adjustments of the front and rear ends of the seat are independently controlled and that the adjustment longitudinally of the seat relatively to the housing 60 is likewise independent of the vertical adjustment thereof. To limit the lengthwise adjustment of the platform and seat, the front and rear portions of the housing 60 are provided with stops 61.

As previously pointed out, the rear rack bars 45b form an integral part of the connecting bar 45a and this bar rests upon the vehicle floor and rocks thereon during the vertical as well as the horizontal or lengthwise adjustment of the seat. The member 45 is free from connection with the vehicle floor and therefore, as pointed out, the seat and its operating mechanism can be moved forwardly into tilted position. This is especially desirable in connection with the front seats of motor vehicle enclosed bodies of the coach type.

I claim:

1. The combination of a vertically adjustable and tiltable seat, supporting means for the seat comprising front and rear pairs of transversely spaced upright rack members supported at their lower ends for longitudinal swinging movement, a pinion meshing with each rack and carried by the seat, means on said seat engaging and guiding said rack bars to maintain the same in position, and means carried by the seat for independently rotating the front and rear pinions to effect vertical travel thereof relative to said rack members and to tilt the seat by independently raising or lowering the front and rear ends thereof.

2. The combination of a vertically adjustable and tiltable seat, supporting means for the seat comprising front and rear pairs of transversely spaced upright rack members supported at their lower ends for longitudinal swinging movement, the supporting means for the front rack members including pivots connected to the floor and for the rear rack members including a rockable transverse floor engaging bar, a pinion meshing with each rack and carried by the seat, means on said seat engaging and guiding said rack bars to maintain the same in position, and means carried by the seat for independently rotating the front and rear pinions to effect vertical travel thereof relative to said rack members and to tilt the seat by independently raising or lowering the front and rear ends thereof.

3. In a seat structure for a vehicle having a floor surface, a vertically adjustable and tiltable seat, depending supporting members on said seat at opposite longitudinal sides thereof, a pair of transversely spaced tiltable upright rack bars for the front end of said seat pivotally connected to said floor surface, a second pair of transversely spaced tiltable upright rack bars for the rear end of said seat, a rockable floor engaging member interconnecting said last named pair of bars, a pinion engaging each of said rack bars, a housing carrying each of said pinions, two of said housings being carried by each of said supporting members and movable with the seat during its vertical and tilting movements, said rack bars being engaged and guided by said housings, and manually controlled means for independently operating the front and rear pairs of pinions to adjust vertically and tilt the front and rear ends of said seat independently of each other and relative to said rack bars.

4. In a seat structure for a vehicle having a floor surface, an adjustable seat, supporting members depending from said seat, a pair of tiltable upright rack bars for the front end of the seat pivotally connected to said floor surface, a second pair of tiltable upright rack bars for the rear end of said seat, a floor engaging member interconnecting said last named pair of bars and resting upon the floor surface, clutch housings carried by said supporting members, one thereof being associated with each of said rack bars, irreversible friction clutch mechanism located within each of said housings and including a pinion engaging the teeth of said rack bar, said rack bars being engaged and guided by said clutch housings, and independent manually controlled means for operating each pair of pinions and associated clutch mechanisms whereby said pinions may be caused to travel along said rack bars to adjust the front or rear ends of said seat independently of one another and relatively to said rack bars.

5. In a seat structure for a vehicle having a floor surface, an adjustable seat, supporting members on said seat, a pair of tiltable upright rack bars for the front end of the seat pivotally connected to said floor surface, a second pair of tiltable upright rack bars for the rear end of said seat, said last named pair of bars having a common floor engaging member resting upon and rockable on the floor surface, clutch housings carried by said supporting members, irreversible clutch mechanism located within each of said housings and including a pinion engaging the teeth of the rack bar, said rack bars being engaged in and guided by said housings, and manually controlled means for operating each pair of pinions and associated clutch mechanism whereby said pinions may be caused to travel along said rack bars to adjust the front or rear end of said seat independently of each other and relatively to said rack bars, said rear pair of rack bars permitting said seat and said supporting members to be bodily raised and tilted forwardly as a unit.

6. In a seat structure for a vehicle having a floor surface, an adjustable seat, depending supporting members on said seat, a pair of tiltable upright rack bars for the front end of the seat pivotally connected to said floor surface, a second pair of tiltable upright rack bars for the rear end of said seat, a rockable floor engaging member interconnecting said last named pair of bars and resting upon the floor surface, a pair of clutch housings carried by each of said supporting members, said rack bars being engaged in and guided by said housings, an irreversible clutch located within each of said housings and including a pinion engaging the teeth of said rack bar, manually controlled means for operating each pair of pinions and associated clutch whereby said pinions may be caused to travel along said rack bars to adjust the front or rear end of said seat vertically independently of each other and relatively to said rack bars, and means independent of said first named manual means for adjusting said seat longitudinally relative to said depending supporting members.

7. In a seat structure for a vehicle provided with a floor surface, an adjustable seat capable of raising and lowering movements relative to the floor surface, spaced supporting members on the underside of said seat, two longitudinally spaced housings fixed to each of said supporting members, a rotatable pinion located in each of said housings, a pair of shafts extending between said seat supporting members and each interconnecting a pair of pinions, a front pair of tiltable rack bars pivotally connected with the floor surface and projecting upward through a pair of housings and engaging the pinions therein for permitting vertical adjustment of the front end of the seat, a rear pair of tiltable rack bars resting upon said floor surface and projecting upward through the other pair of housings and engaging the pinions therein for permitting vertical adjustment of the rear end of the seat, and independent manually controlled means associated with each of said shafts whereby the pinions carried thereby may be rotated to travel along said rack bars to raise and lower independently the front and rear ends of the seat.

8. In a seat structure for a vehicle having a floor surface, an adjustable seat provided with spaced supporting members, a pair of tiltable upright rack bars for the front end of said seat pivotally connected to said floor surface, a second pair of tiltable upright rack bars for the rear end of said seat, said last named pair of bars being interconnected by a floor engaging member rockably resting upon the floor surface, means on said seat engaging and guiding said rack bars to maintain the same in position, and rotatable pinions carried by said seat supporting members, one thereof engaging each of said rack bars whereby upon rotation of said front and rear pairs of pinions the front and rear ends of said seat may be adjusted vertically relatively to one another and to said floor surface.

9. In a seat structure for a vehicle having a floor surface, an adjustable seat provided with spaced supporting members, a pair of tiltable upright rack bars for the front end of said seat pivotally connected to said floor surface, a second pair of tiltable upright rack bars for the rear end of said seat having their lower ends resting upon the floor surface, rotatable pinions carried by said seat supporting members, one thereof being associated with and engaging each of said rack bars, and independent manually controlled means for rotating each pair of pinions to raise or lower the front and rear ends of said seat supporting members relative to each other.

10. In a seat structure for a vehicle having a floor surface, an adjustable seat, a pair of tiltable upright rack bars for the front end of said seat pivotally connected to said floor surface, a second pair of tiltable upright rack bars for the rear end of said seat resting upon the floor surface, rotatable pinions carried by said seat, one thereof being associated with and engaging each of said rack bars, means on said seat engaging and guiding said rack bars to maintain the same in position, and independent manually controlled means for rotating each pair of pinions to raise or lower the front and rear ends of said seat relative to each other, said seat being adapted to be tilted forwardly as a unit about the pivotal connection between said front pair of rack bars and said floor surface.

11. The combination of a vertically adjustable and tiltable seat, supporting means for the seat comprising front and rear pairs of transversely spaced upright rack members supported at their lower ends for longitudinal swinging movement, a pinion meshing with each rack and carried by the seat, means on said seat engaging and guiding said rack members to maintain the same in position, means carried by the seat for independently rotating the front and rear pinions to effect vertical travel thereof relative to said rack members and to tilt the seat by independently raising or lowering the front and rear ends thereof, and a counterbalancing lifting spring interconnecting said seat and a rack bar.

12. In a seat structure for a vehicle having a floor surface, a vertically adjustable and tiltable seat, depending supporting members on said seat at opposite longitudinal sides thereof, a pair of transversely spaced tiltable upright rack bars for the front end of said seat pivotally connected to said floor surface, a second pair of transversely spaced tiltable upright rack bars for the rear end of said seat, a floor engaging member interconnecting said last named pair of bars and resting upon the floor surface, a pinion engaging each of said rack bars, a housing carrying each of said pinions, two of said housings being carried by each of said supporting members and movable with the seat during its vertical and tilting movements, said rack bars being engaged and guided by said housings, manually controlled means for independently operating the front and rear pairs of pinions to adjust vertically and tilt the front and rear ends of said seat independently of each other and relative to said rack bars, and a counterbalancing lifting spring interconnecting said seat and a rack bar.

ALBERT P. BALL.